US010827260B2

(12) United States Patent
Chen

(10) Patent No.: US 10,827,260 B2
(45) Date of Patent: Nov. 3, 2020

(54) HEARING AID SYSTEM

(71) Applicant: Hsiao-Han Chen, Tainan (TW)

(72) Inventor: Hsiao-Han Chen, Tainan (TW)

( * ) Notice: Subject to any disclaimer, the term of this patent is extended or adjusted under 35 U.S.C. 154(b) by 0 days.

(21) Appl. No.: 16/734,671

(22) Filed: Jan. 6, 2020

(65) Prior Publication Data

US 2020/0228894 A1 Jul. 16, 2020

(30) Foreign Application Priority Data

Jan. 10, 2019 (TW) ............................. 108100992 A

(51) Int. Cl.
*H04R 3/00* (2006.01)
*H04R 1/40* (2006.01)
*G06K 9/00* (2006.01)

(52) U.S. Cl.
CPC ........... *H04R 1/406* (2013.01); *G06K 9/0063* (2013.01); *H04R 2203/12* (2013.01); *H04R 2430/00* (2013.01)

(58) Field of Classification Search
CPC .............................. H04R 1/406; G06K 9/0063
See application file for complete search history.

(56) References Cited

U.S. PATENT DOCUMENTS

| | | | | |
|---|---|---|---|---|
| 10,282,057 | B1 * | 5/2019 | Binder | G06F 3/013 |
| 2013/0044130 | A1 * | 2/2013 | Geisner | G06F 3/002 345/633 |
| 2017/0295361 | A1 * | 10/2017 | Dashwood | G06F 3/012 |
| 2018/0114063 | A1 * | 4/2018 | Wexler | H04N 5/23206 |
| 2018/0167581 | A1 * | 6/2018 | Goesnar | G01S 3/80 |
| 2018/0349684 | A1 * | 12/2018 | Bapat | G06K 9/6218 |
| 2019/0163982 | A1 * | 5/2019 | Block | G06N 5/022 |

* cited by examiner

*Primary Examiner* — Simon King
(74) *Attorney, Agent, or Firm* — Osha Liang LLP

(57) ABSTRACT

A hearing aid system includes an image capturing device capturing an image, microphones, an audio processing device connected with the image capturing device and the microphones, and an audio output device connected with the audio processing device. The audio processing device, by using classification models, performs analysis on the image to determine one of the classification models, controls the microphones to receive sound according to a plan which corresponds to the classification model, and operates in a mode corresponding to the plan to perform audio signal processing on collected audio signal(s) generated by the microphones so as to generate a processed audio signal, based on which the audio output device outputs sound.

9 Claims, 3 Drawing Sheets

HEARING AID SYSTEM

CROSS-REFERENCE TO RELATED APPLICATION

This application claims priority of Taiwanese Invention Patent Application No. 108100992, filed on Jan. 10, 2019.

FIELD

The disclosure relates to a hearing aid system, and more particularly to a hearing aid system that is capable of switching between modes of sound receiving for different scenes.

BACKGROUND

A conventional hearing aid device is capable of distinguishing between speech and noise in an audio signal so as to filter out the noise from the audio signal, and is able to reduce, by utilizing a directional microphone, reception of sounds coming from the back and sides of a user who wears the conventional hearing aid device. Moreover, the conventional hearing aid device is operable to activate one of an omnidirectional microphone and the directional microphone for sound receiving. For different scenes which present different types of surroundings for the user (e.g., at markets, in restaurants, during oral presentations, in meetings, and the like), sources of speaking sounds may have varying characteristics. However, the conventional hearing aid device may not recognize which one of the scenes the user is currently situated in, and thus may not adopt a suitable strategy to control microphone (s) for sound receiving.

Moreover, another conventional hearing aid device utilizes techniques of binaural hearing and beamforming to identify a location/direction of a speaker for directional reception of sound from the speaker. However, in a scenario where there are multiple speakers speaking, such approach simply identifies the location/direction of one of the speakers having the loudest voice, and thus cannot allow the user to hear sound from another one of the speakers.

SUMMARY

Therefore, an object of the disclosure is to provide a hearing aid system that can improve at least one of the drawbacks of the prior art.

According to the disclosure, the hearing aid system is adapted to be used by a user and capable of switching between modes of sound receiving for different scenes. The hearing aid system includes an image capturing device, a microphone assembly, an audio processing device and an audio output device.

The image capturing device is configured to capture a field of view (FOV) image which is an image of surroundings seen by the user.

The microphone assembly includes a plurality of microphones spaced apart from each other. Each of the microphones is individually controllable to receive sound to generate a collected audio signal.

The audio processing device is communicably connected with the image capturing device and the microphones, and includes a scene analysis module, a microphone controller and an audio signal processor. The scene analysis module stores a plurality of scene classification models each of which is related to a specific scene. The scene analysis module is configured to, by using the scene classification models, perform analysis on the FOV image captured by the image capturing device so as to determine one of the scene classification models with the specific scene that matches the FOV image. The microphone controller stores a plurality of sound-receiving plans which respectively correspond to the scene classification models. The microphone controller is configured to control a preset number of the microphones to receive sound according to a target one of the sound-receiving plans which corresponds to the one of the scene classification models determined by the scene analysis module. The audio signal processor is switchable between a plurality of audio processing modes which respectively correspond to the sound-receiving plans. The audio signal processor is configured to operate in one of the audio processing modes corresponding to the target one of the sound-receiving plans to perform audio signal processing on the collected audio signal(s) generated by the preset number of the microphones so as to generate a processed audio signal.

The audio output device is communicably connected with the audio processing device, and is configured to output sound for the user based on the processed audio signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
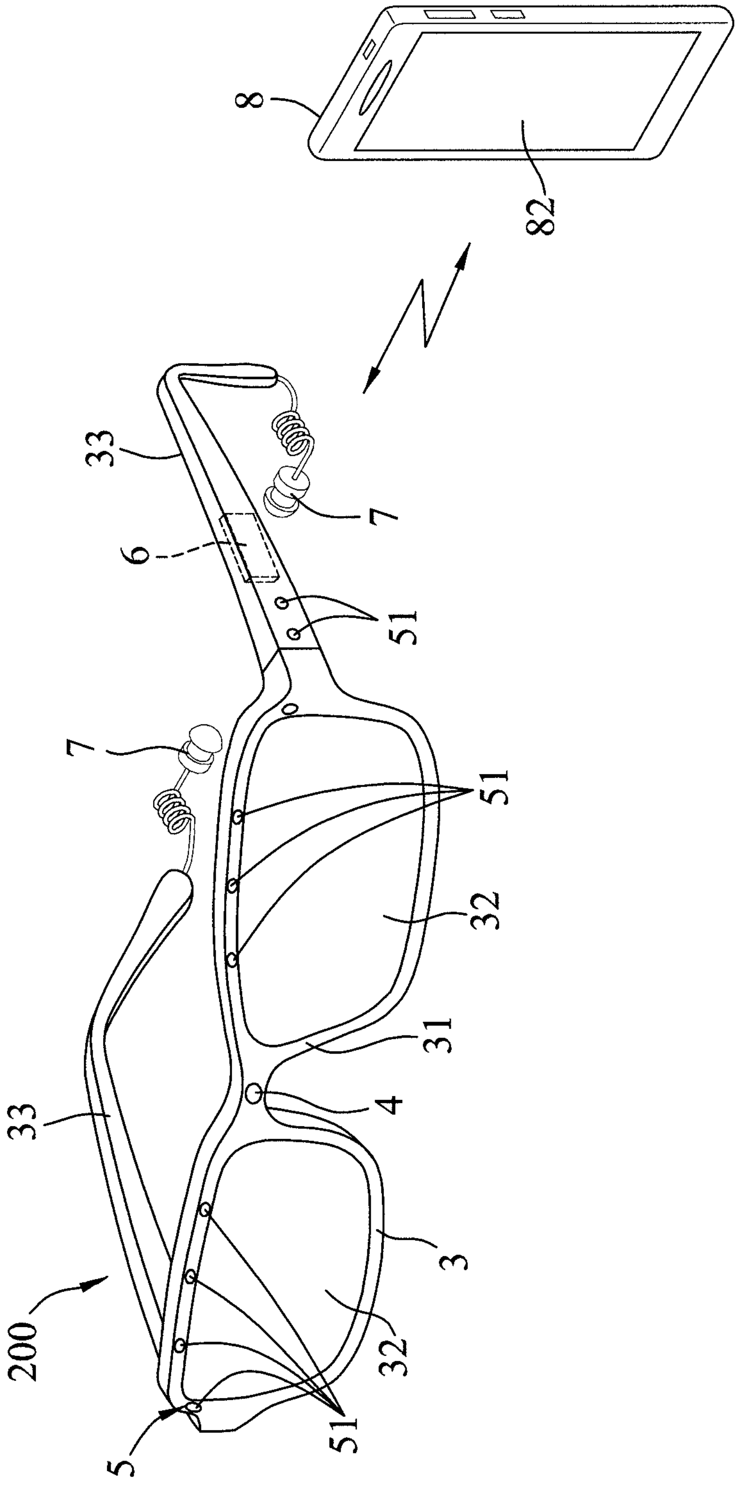
FIG. 1 is a perspective view illustrating an embodiment of a hearing aid system according to the disclosure.
Figure 2:
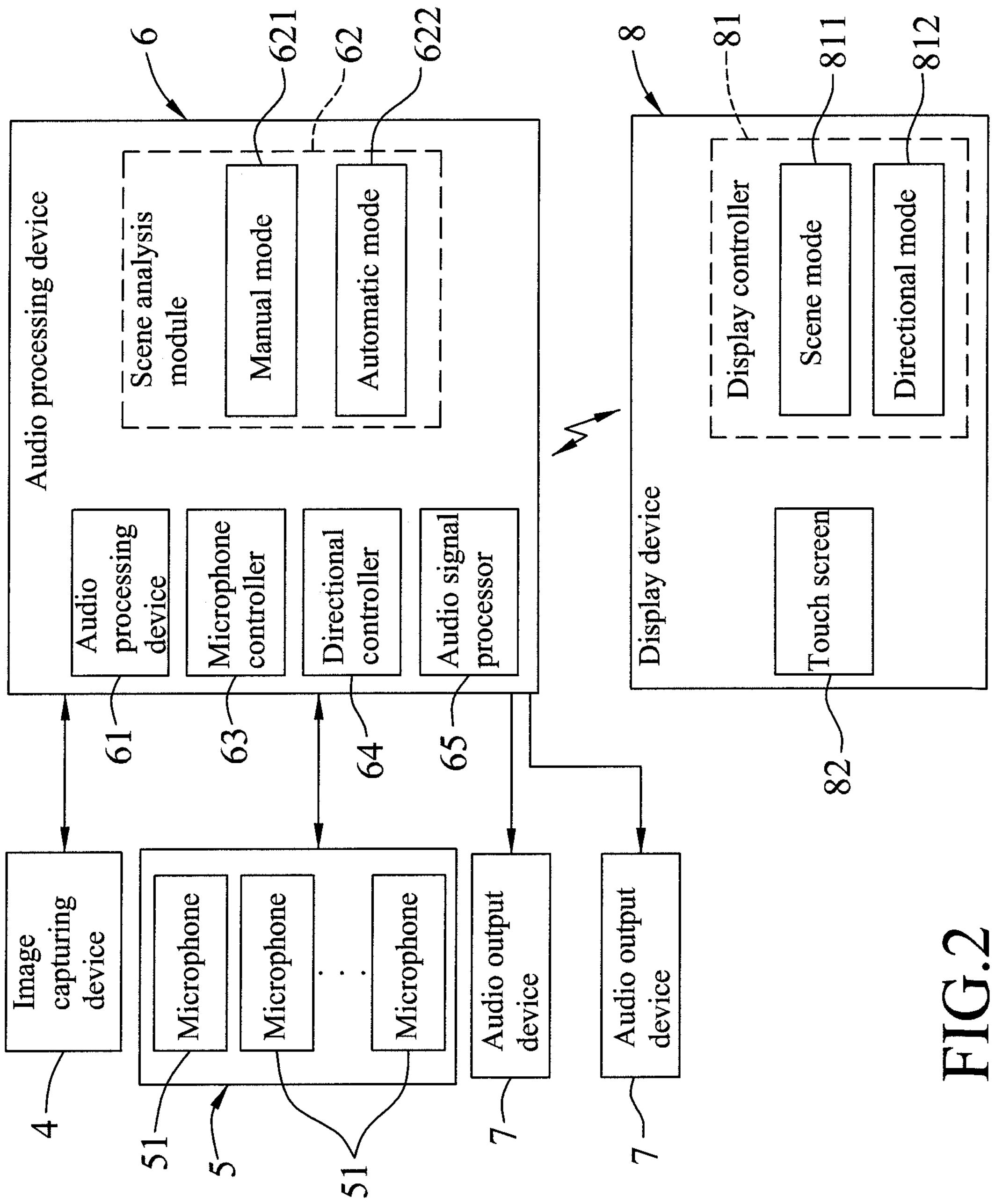
FIG. 2 is a schematic block diagram illustrating the embodiment of the hearing aid system according to the disclosure.

Referring to FIGS. 1 and 2, an embodiment of a hearing aid system 200 according to the disclosure is illustrated. The hearing aid system 200 is adapted to be used by a user, and is capable of switching between modes of sound receiving for different scenes.

The hearing aid system 200 includes a carrier 3, an image capturing device 4, a microphone assembly 5, an audio processing device 6, two audio output devices 7 and a display device 8.

In this embodiment, the carrier 3 is a pair of glasses to be mounted on the head of the user, and has two lenses 32 to be respectively positioned in front of the eyes of the user. The carrier 3 further has a frame front 31, and left and right frame sides 33 that are respectively engaged to two opposite sides of the frame front 31 and that are adapted to be mounted on respective ears of the user.

The image capturing device 4 is mounted on a middle region of the frame front 31 of the carrier 3, and is configured to capture a field of view (FOV) image which is an image of surroundings seen by the user.

The microphone assembly 5 includes a plurality of microphones 51 that are spaced apart from each other and that are mounted on the two opposite sides of the frame front 31 and the left and right frame sides 33. Each of the microphones 51 is individually controllable to receive sound to generate a collected audio signal.

The audio processing device 6 is communicably connected with the image capturing device 4, the microphones

51, the audio output devices 7 and the display device 8. It should be noted that implementation of the aforementioned connection may be realized by wired/wireless communication techniques. Since implementation of wired/wireless communication techniques has been well known to one skilled in the relevant art, detailed explanation of the same is omitted herein for the sake of brevity.

The audio processing device 6 includes an activation controller 61, a scene analysis module 62, a microphone controller 63, a directional controller 64 and an audio signal processor 65.

The activation controller 61 activates one of the microphones 51 to receive sound to generate the collected audio signal, and activates the audio signal processor 65 to analyze the collected audio signal so as to determine whether the collected audio signal contains speech information. When it is determined that the collected audio signal contains speech information, the activation controller 61 activates the image capturing device 4 and the scene analysis module 62.

The scene analysis module 62 stores a plurality of scene classification models each of which is related to a specific scene. Each of the scene classification models is established in advance based on training data, such as different images of the related specific scene, and is used to evaluate a degree of matching between a to-be-evaluated input image and the related specific scene. The scene analysis module 62 is configured to, by using the scene classification models, perform analysis on the FOV image captured by the image capturing device 4 so as to determine one of the scene classification models with the specific scene that matches the FOV image. Specifically speaking, the scene analysis module 62 is configured to perform the analysis by using the scene classification models on the FOV image based on features of the FOV image so as to determine, for each of the scene classification models, a degree of matching between the FOV image and the specific scene. The scene analysis module 62 outputs to the display device 8 a comparison result that indicates a subset of the scene classification models, in which the degree of matching between the specific scene of each of the scene classification models and the FOV image is greater than a predetermined threshold, so as to enable the display device 8 to display options of the subset of the scene classification models for selection by the user of a target classification model among the subset of the scene classification models.

The features of the FOV image may include two or more of a type of environment in the FOV image, an object in the FOV image, a total number of people in the FOV image, a posture of each person in the FOV image, a type of an activity performed by each person in the FOV image, and an orientation, a distance or a direction of each person with respect to the image capturing device 4. The type of environment in the FOV image may be a classroom scene, a presentation scene, a meeting room scene, an outdoor park scene, a party scene, a traditional market scene, a supermarket scene, a convenience store scene, a street scene, a commuting scene, a bank scene, or the like, but is not limited to the disclosure herein. The object in the FOV image may be a conference table, a blackboard, a whiteboard, a lectern, a projector, a projector screen, a tree, a plant, the ground of a green space, sky, an aisle, a transportation vehicle, a shelf, a cash register, or the like. It should be noted that implementations of the features of the FOV image may vary in other embodiments and are not limited to the disclosure herein.

Algorithms used in the scene classification models may be algorithms of deep learning, deep belief network, complex decision tree, cosine k-nearest neighbors (cosine k-NN), convolutional neural network (CNN), quadratic support vector machine, or the like. However, the algorithms used in the scene classification models are not limited to the disclosure herein and may vary in other embodiments. Since implementations of algorithms used in classification models have been well known to one skilled in the relevant art, detailed explanation of the same is omitted herein for the sake of brevity.

The scene analysis module 62 is operable to switch between a manual mode 621 and an automatic mode 622. When the scene analysis module 62 is in the manual mode 621, the scene analysis module 62 controls the display device 8 to display options of all the scene classification models for selection by the user of one of the scene classification models to serve as the target classification model. When the scene analysis module 62 is in the automatic mode 622, the scene analysis module 62 determines the degree of matching for each of the scene classification models, and outputs the comparison result to control the display device 8 to display the options of the subset of the scene classification models, in which the degree of matching between the specific scene of each of the scene classification models and the FOV image is greater than the predetermined threshold, for selection by the user. The options respectively represent the specific scenes of the scene classification models, and may be displayed in a form of text, images and a combination thereof.

It should be noted that the scene analysis module 62 may be implemented by one of hardware, firmware, software, and any combination thereof. For example, the scene analysis module 62 may be implemented to be software modules in a program, where the software modules contain codes and instructions to carry out specific functionalities, and can be called individually or together to fulfill the hearing aid system 200 of this disclosure.

The microphone controller 63 stores a plurality of sound-receiving plans which respectively correspond to the scene classification models, and is configured to control a preset number of the microphones 51 to receive or collect sound according to a target one of the sound-receiving plans which corresponds to the one of the scene classification models that is determined by the scene analysis module 62 or the target classification model that is selected by the user. For example, based on the target one of the sound-receiving plans, the microphone controller 63 may control one of the microphones 51 to perform omnidirectional sound receiving or control preset ones of the microphones 51 to cooperatively perform directional sound receiving.

The audio signal processor 65 is switchable between a plurality of audio processing modes which respectively correspond to the sound-receiving plans. The audio signal processor 65 is configured to operate in one of the audio processing modes corresponding to the target one of the sound-receiving plans adopted by the microphone controller 63 to perform audio signal processing on the collected audio signal(s) generated by the preset number of the microphones 51 so as to generate a processed audio signal. The audio signal processing may be an analog-to-digital conversion, a noise reduction process, or a speech extraction process, but is not limited to the disclosure herein and may vary in other embodiments. In this embodiment, the audio signal processing is performed on the collected audio signal(s) to filter out noise in the collected audio signal(s) and to extract and amplify speech contents in the collected audio signal(s) so as to enhance the signal-to-noise ratio of the processed audio signal.

In this embodiment, the audio processing device 6 is integrated with the carrier 3 (i.e., the pair of glasses), and establishes communication with the display device 8, which may be held by the user, based on wireless communication techniques. However, in other embodiments, the audio processing device 6 may be integrated with the display device 8, instead of the carrier 3, to reduce the number of electronic components mounted on the carrier 3 and in turn, the load on the head of the user.

The audio output devices 7 are configured to output sound for the user based on the processed audio signal. The audio output devices 7 may be implemented by, but are not limited to, headphones or loudspeakers.

Figure 3:
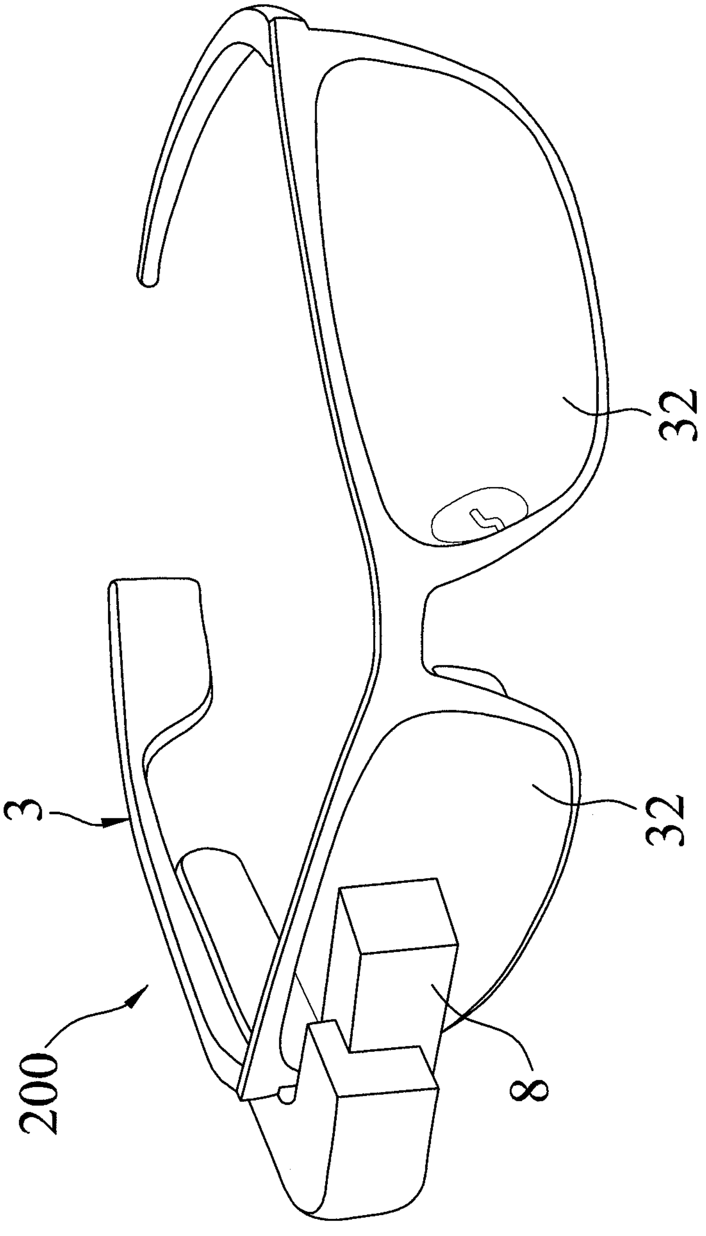
FIG. 3 is a perspective view illustrating another embodiment of the hearing aid system according to the disclosure.

Referring to FIG. 3, in this embodiment, the display device 8 is mounted on the carrier 3, and is configured to project the options of the subset of the scene classification models on the lenses 32 of the carrier 3 based on techniques of micro-projection for viewing and selection by the user, where the selection among the options of the subset of the scene classification models may be realized by means of visual control or other manual input components. In one embodiment, the display device 8 is a see-through display (e.g., transparent light-emitting diode (LED) display or transparent liquid-crystal display (LCD) display) mounted on the carrier 3, and is to be positioned in front of the eyes of the user.

In other embodiments, the display device 8 may be implemented by a portable device such as a smartphone or a tablet, or by a wearable device such as a smart wristband, a smart watch or a smart necklace. However, implementation of the display device 8 is not limited to the disclosure herein and may vary in other embodiments.

In one embodiment where the display device 8 is implemented by the portable device or the wearable device, the display device 8 includes a display controller 81 and a touch screen 82. The display controller 81 is switchable between a scene mode 811 and a directional mode 812. When the display controller 81 is operated in the scene mode 811, the display controller 81 is configured to, in response to receipt of the comparison result outputted by the scene analysis module 62, control the touch screen 82 to display the options of the subset of the scene classification models, and to transmit to the audio processing device 6 a scene designation signal which indicates the target classification model being selected. The microphone controller 63 is configured to utilize the target one of the sound-receiving plans based on the scene designation signal to control the preset number of the microphones 51. However, in other embodiments, when the display controller 81 is operated in the scene mode 811, the display controller 81 is configured to control the touch screen 82 to display the options of all of the scene classification models for selection by the user.

When the display controller 81 is in the directional mode 812, the display controller 81 is configured to control the touch screen 82 to display the FOV image captured by the image capturing device 4 in real time, to generate a direction designation signal which indicates a position of a selected area in the FOV image based on the user input of selecting the selected area, and to output the direction designation signal to the audio processing device 6. It is noted that selecting the selected area in the FOV image may also be realized by means of visual control or other manual input components. The directional controller 64 is configured to control, in response to receipt of the direction designation signal, a predefined number of the microphones 51 at predefined position(s) to receive sound for generating the collected audio signal(s). The predefined number of the microphones 51 at the predefined position(s) cooperate to form a microphone array. The audio signal processor 65 is configured to, after being triggered by the directional controller 64, perform the analog-to-digital conversion, the noise reduction process, a filtering process by using beamforming techniques, and the speech extraction process on the collected audio signal (s) so as to generate a processed audio signal which corresponds to sound coming from a direction that is related to the position of the selected area in the FOV image. Since implementation of the analog-to-digital conversion, the noise reduction process, the filtering process by using beamforming techniques, and the speech extraction process have been well known to one skilled in the relevant art, detailed explanation of the same is omitted herein for the sake of brevity.

When using the hearing aid system 200, the user wears the carrier 3 on his/her head, mounts the audio output devices 7 on his/her ears, and holds the display device 8 in his/her hand. When the hearing aid system 200 is turned on, the image capturing device 4 does not instantly capture the FOV image. The audio processing device 6 initially controls one of the microphones 51 to perform omnidirectional sound receiving, and actives the image capturing device 4 to capture the FOV image only when it is determined that the collected audio signal contains speech information by analyzing the collected audio signal.

When the display controller 81 is operated in the scene mode 811, and when the scene analysis module 62 is in the manual mode 621, the display device 8 is controlled by the audio processing device 6 to display the options of all the scene classification models for selection by the user of one of the scene classification models to serve as the target classification model. When the display controller 81 is operated in the scene mode 811, and when the scene analysis module 62 is in the automatic mode 622, the audio processing device 6 determines the degree of matching for each of the scene classification models, and outputs to the display device 8 the comparison result that indicates the subset of the scene classification models, in which the degree of matching between the specific scene of each of the scene classification models and the FOV image is greater than the predetermined threshold. The display device 8 displays the options of the subset of the scene classification models. Based on current surroundings, the user may operate the display device 8 to select among the subset of the scene classification models the target classification model which matches his/her needs. The display device 8 then transmits to the audio processing device 6 the scene designation signal which indicates the target classification model being selected. Based on the scene designation signal, the audio processing device 6 determines the target one of the sound-receiving plans to control the microphone(s) 51 to receive sound, and performs the audio signal processing on the collected audio signal(s) generated by the microphone(s) 51 so as to generate the processed audio signal, based on which the audio output devices 7 output sound for the user.

In one embodiment, the display device 8 is omitted. The scene analysis module 62 performs analysis by using the scene classification models on the FOV image captured by the image capturing device 4, and automatically determines one of the scene classification models with the specific scene that has the greatest degree of matching with the FOV image. In other words, the hearing aid system 200 directly selects one of the sound-receiving plans to control the microphone(s) 51 to receive sound, without providing the options of all of (or the subset of) the scene classification models for the user to select via the display device 8.

In summary, the hearing aid system 200 according to the disclosure utilizes the scene analysis module 62 of the audio processing device 6 to perform analysis by using the scene classification models on the FOV image captured by the image capturing device 4 to determine one (s) of the scene classification models based on the degrees of matching each between the FOV image and the specific scene of a respective one of the scene classification models. Then, the hearing aid system 200 utilizes the microphone controller 63 to control the microphone(s) to receive sound according to the target one of the sound-receiving plans which corresponds to the one of the classification models that is determined by the scene analysis module 62 in the automatic mode 622 or the target classification model that is selected by the user when the scene analysis module 62 is in the manual mode 621, and utilizes the audio signal processor 65 to perform audio signal processing, which corresponds to the one of the scene classification models or the target classification model, on the collected audio signal(s) generated by the microphone(s) so as to generate the processed audio signal. In addition, the display controller 81 may be operated by the user to switch to the directional mode 812. When the display controller 81 operates in the directional mode and an area of the FOV image displayed on the display device 8 is selected by the user, the audio processing device 6 may be controlled to receive sound coming from a direction corresponding to the selected area in the FOV image by using beamforming techniques. Since the factor of scenes is taken into account while collecting sounds and performing audio signal processing thereon, improvement can be made on receiving the correct sound from intended sound source(s).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hearing aid system adapted to be used by a user and capable of switching between modes of sound receiving for different scenes, comprising:

- an image capturing device configured to capture a field of view (FOV) image which is an image of surroundings seen by the user;
- a microphone assembly including a plurality of microphones spaced apart from each other, each of said microphones being individually controllable to receive sound to generate a collected audio signal;
- an audio processing device communicably connected with said image capturing device and said microphones, and including
  - a scene analysis module that stores a plurality of scene classification models each of which is related to a specific scene, and that is configured to, by using the scene classification models, perform analysis on the FOV image captured by said image capturing device so as to determine one of the scene classification models with the specific scene that matches the FOV image,
  - a microphone controller that stores a plurality of sound-receiving plans which respectively correspond to the scene classification models, and that is configured to control a preset number of said microphones to receive sound according to a target one of the sound-receiving plans which corresponds to the one of the scene classification models determined by said scene analysis module, and
  - an audio signal processor that is switchable between a plurality of audio processing modes which respectively correspond to the sound-receiving plans, and is configured to operate in one of the audio processing mode corresponding to the target one of the sound-receiving plans to perform audio signal processing on the collected audio signal(s) generated by the preset number of said microphones so as to generate a processed audio signal; and
- an audio output device communicably connected with said audio processing device, and configured to output sound for the user based on the processed audio signal.

2. The hearing aid system as claimed in claim 1, further comprising:

- a display device communicably connected with said audio processing device;
- wherein said scene analysis module is further configured to perform the analysis on the FOV image by using the scene classification models based on features of the FOV image so as to determine, for each of the scene classification models, a degree of matching between the FOV image and the specific scene, and to output to said display device a comparison result that indicates a subset of the scene classification models, in which the degree of matching between the specific scene of each of the scene classification models and the FOV image is greater than a predetermined threshold, so as to enable said display device to display options of the subset of the scene classification models for selection by the user of a target classification model among the subset of the scene classification models; and
- wherein said microphone controller is configured to control the preset number of said microphones to collect sound according to the target one of the sound-receiving plans which corresponds to the target classification model.

3. The hearing aid system as claimed in claim 2, wherein said scene analysis module is operable to switch between a manual mode where said scene analysis module controls said display device to display options of all the scene classification models for selection by the user of one of the scene classification models to serve as the target classification model, and an automatic mode where said scene analysis module determines the degree of matching for each of the scene classification models, and outputs the comparison result to control said display device to display the options of the subset of the scene classification models, in which the degree of matching between the specific scene of each of the scene classification models and the FOV image is greater than the predetermined threshold, for selection by the user.

4. The hearing aid system as claimed in claim 2, further comprising a carrier that is to be mounted on the user, wherein said image capturing device and said microphones of said microphone assembly are mounted on said carrier.

5. The hearing aid system as claimed in claim 4, wherein:

said carrier is a pair of glasses that have a lens to be positioned in front of the eyes of the user; and said display device is mounted on said carrier, and is configured to project the options of the subset of the scene classification models on said lens of said carrier based on techniques of micro-projection for selection by the user.

6. The hearing aid system as claimed in claim 4, wherein:

said carrier is a pair of glasses; and said display device is a see-through display mounted on said carrier, and is to be positioned in front of the eyes of the user.

7. The hearing aid system as claimed in claim 2, wherein:

said display device includes a touch screen, and a display controller that is operable in a scene mode, and is configured to, when said display controller is in the scene mode, control said touch screen to display the options of the subset of the scene classification models, and to transmit to said audio processing device a scene designation signal which indicates the target classification model being selected; and said microphone controller is configured to utilize the target one of the sound-receiving plans based on the scene designation signal to control the preset number of said microphones.

8. The hearing aid system as claimed in claim 7, wherein:

said audio processing device further includes a directional controller;

said display controller is switchable between the scene mode and a directional mode, and is further configured to, when said display controller is in the directional mode, control said touch screen to display the FOV image captured by said image capturing device in real time, to generate a direction designation signal which indicates a position of a selected area in the FOV image based on the user input of selecting the selected area, and to output the direction designation signal to said audio processing device;

said directional controller is configured to control, in response to receipt of the direction designation signal, a predefined number of said microphones at predefined position(s) to receive sound for generating the collected audio signal(s); and said audio signal processor is configured to perform a filtering process on the collected audio signal(s) by using beamforming techniques so as to generate a processed audio signal which corresponds to sound coming from a direction that is related to the position of the selected area in the FOV image.

9. The hearing aid system as claimed in claim 1, wherein:

said audio processing device further includes an activation controller that activates one of said microphones to receive sound to generate the collected audio signal, and that activates said audio signal processor to analyze the collected audio signal so as to determine whether the collected audio signal contains speech information; and when it is determined that the collected audio signal contains speech information, said activation controller activates said image capturing device and said scene analysis module.

* * * * *